June 13, 1961   J. L. BOWER   2,988,681
ERROR COMPENSATED SERVO
Filed Feb. 12, 1958   5 Sheets-Sheet 1

INVENTOR.
JOHN L. BOWER
BY
Allan Rothenberg
ATTORNEY

INVENTOR.
JOHN L. BOWER
BY
Allan Rothenberg
ATTORNEY

INVENTOR.
JOHN L. BOWER

INVENTOR.
JOHN L. BOWER

United States Patent Office 2,988,681
Patented June 13, 1961

2,988,681
ERROR COMPENSATED SERVO
John L. Bower, Downey, Calif., assignor to
North American Aviation, Inc.
Filed Feb. 12, 1958, Ser. No. 714,716
12 Claims. (Cl. 318—28)

This invention relates to servo systems and, more particularly, to the correction of errors inherent in the operation of a servo controlled machine upon a workpiece.

In a servo system such as, for example, a machine tool driven by an error signal derived as a function of a difference between machine motion and an input signal indicative of command or desired motion, accuracy may be compromised by a number of factors. Such factors may include changes in the dimensions of the machine, the workpiece and the gages due to temperature variations and, in addition, errors resulting from lack of perpendicularity of the axes of a multi-axis machine. For optimum precision it is therefore desirable and necessary to correct the machine motion as a function of these error introducing factors. For purposes of exposition, the invention will be described in connection with the compensation of the errors inherent in a two-axis digitally controlled machine tool, although it will be readily appreciated that the invention may also be applied to machines controlled on axes which are more or less than two in number and also to a machine using analog rather than digital servo techniques.

A servo system as described in connection with the present invention includes a gage on the machine for producing a multi-phase signal indicative of both magnitude and sense of machine motion, a direction circuit for converting the multi-phase gage signal to a series of direction and magnitude indicating pulses, a comparator for comparing the motion pulses with the input director pulses and a motor for effecting the desired machine motion in accordance with the output of the comparator. In accordance with the present invention, there is computed a correction signal which is combined with the multi-phase gage signal to introduce the equivalent of an offset of gage head motion or an addition thereto. The corrected multi-phase gage signal is then fed to the multi-phase to pulse conversion network. The correction computer senses temperature of the workpiece, the gage and the machine itself and, further, senses motion along each of the machine axes. The signals produced by the computer sensing devices are operated upon by the computer to produce the desired correction signal which thus may be a function of one or more or all of the error introducing factors. Thus, the comparator operated from the corrected gage signal will indicate the actual physical movement of the machine as modified by a correction factor introduced by the correction computer.

It is an object of this invention to improve the precision of a servo system.

A further object of this invention is the correction of errors inherent in the operation of a servo controlled machine tool.

Another object of this invention is the compensation for temperature induced changes in dimensions of a machine tool gage, a workpiece, the machine tool itself, or any combination of these.

Another object of the invention is the correction of errors due to deviation of servo controlled machine tool axes from a desired angular relation therebetween.

These and other objects of the invention will become apparent from the following description taken in connection with the accompanying drawings, in which FIG. 1 is a functional diagram of a two-axis servo controlled machine tool incorporating the correction apparatus of the invention;

Figure 6:
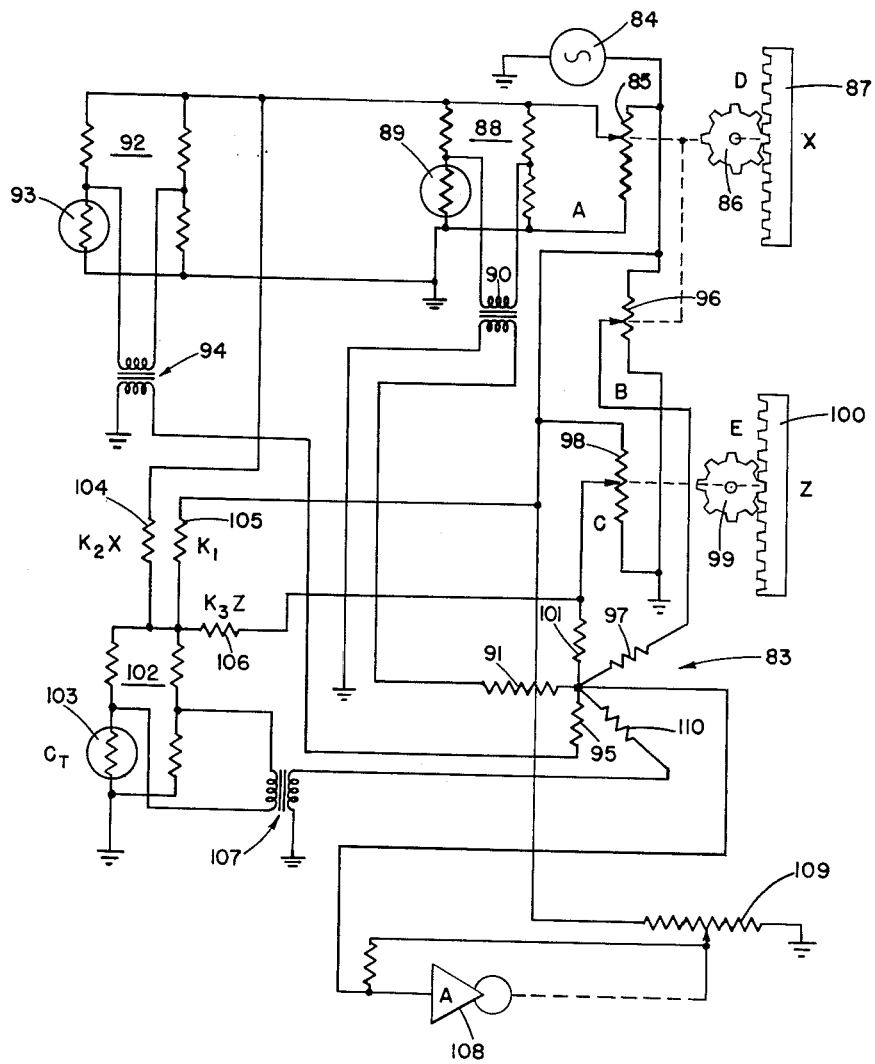

And, FIG. 6 illustrates details of the correction of computer circuitry.

Figure 1:
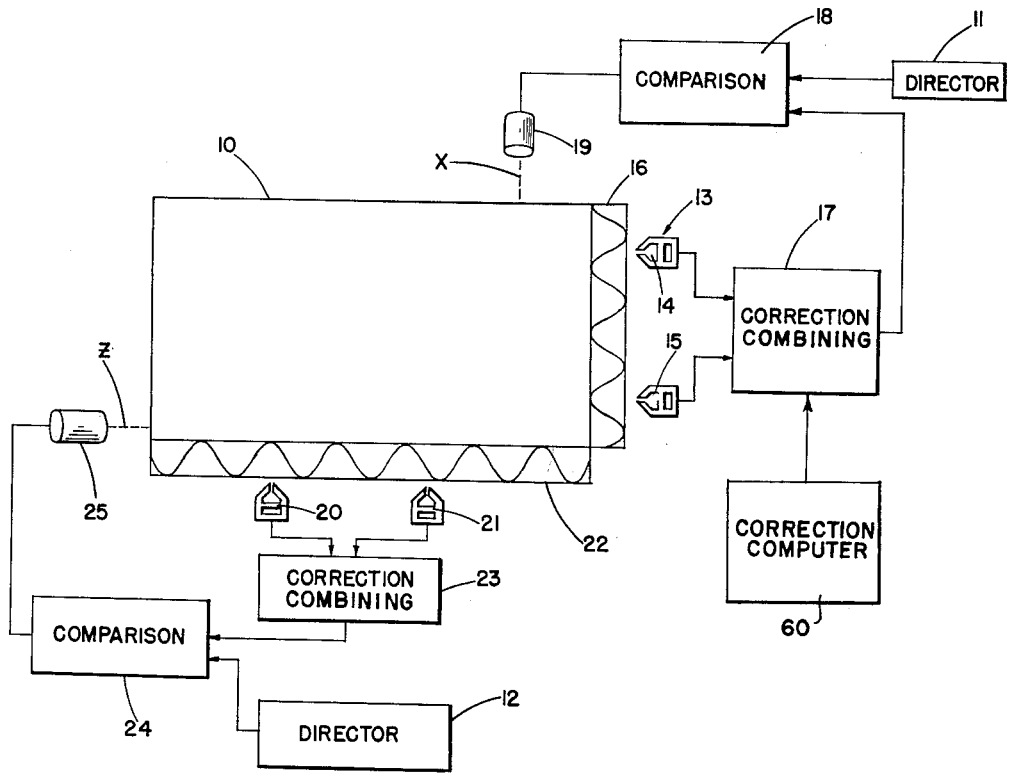

Illustrated in FIG. 1 is the worktable 10 of a servo controlled machine tool which is to be driven under the control of digital signals or pulses supplied from directors 11 and 12 along mutually orthogonal axes X and Z respectively. It is to be understood that a workpiece to be operated upon will be securely affixed to the table 10 which is movable along the two axes relative to a cutting tool, not shown, operatively associated with the table and workpiece. Obviously, the X and Z axis drive may be applied to the cutting tool itself rather than to the worktable if the machine has a fixed table and movable cutting tool. Table motion along the X axis is sensed by a gage 13 having pickup heads 14 and 15 and a gage rod 16 fixed to the table for movement therewith and bearing indicia representing X axis motion or increments thereof. The gage heads 14 and 15 are fixed and thus will produce a signal indicative of X axis motion of the table 10. The gage head signals are modified by being fed through correction combining circuit 17 which combines with the gage signal a computed correction from a signal source such as a computer 60. This correction may be indicative of errors due to one or more conditions. The corrected gage signal is compared in comparator 18 with the input signal from director 11 to produce an error signal which is fed to motor 19 which drives the table along the X axis. The Z axis control of the table 10 is substantially similar to the X axis control and may or may not include correction circuitry as deemed necessary or desirable. Motion along the Z axis is sensed by Z axis gage heads 20 and 21 in conjunction with Z axis gage rod 22 to feed a signal through Z axis correction combining circuit 23 for comparison in comparator 24 with the signal from director 12 to produce the Z axis error signal which controls motor 25 to effect the desired Z axis motion. If deemed necessary or desirable, combining circuit 23 may have an additional signal input (from a source not shown) as described in connection with the X axis drive. While a two-axis machine is illustrated it will be readily appreciated that the invention may equally well be applied to control of either a single or three-axis machine.

Figure 2:
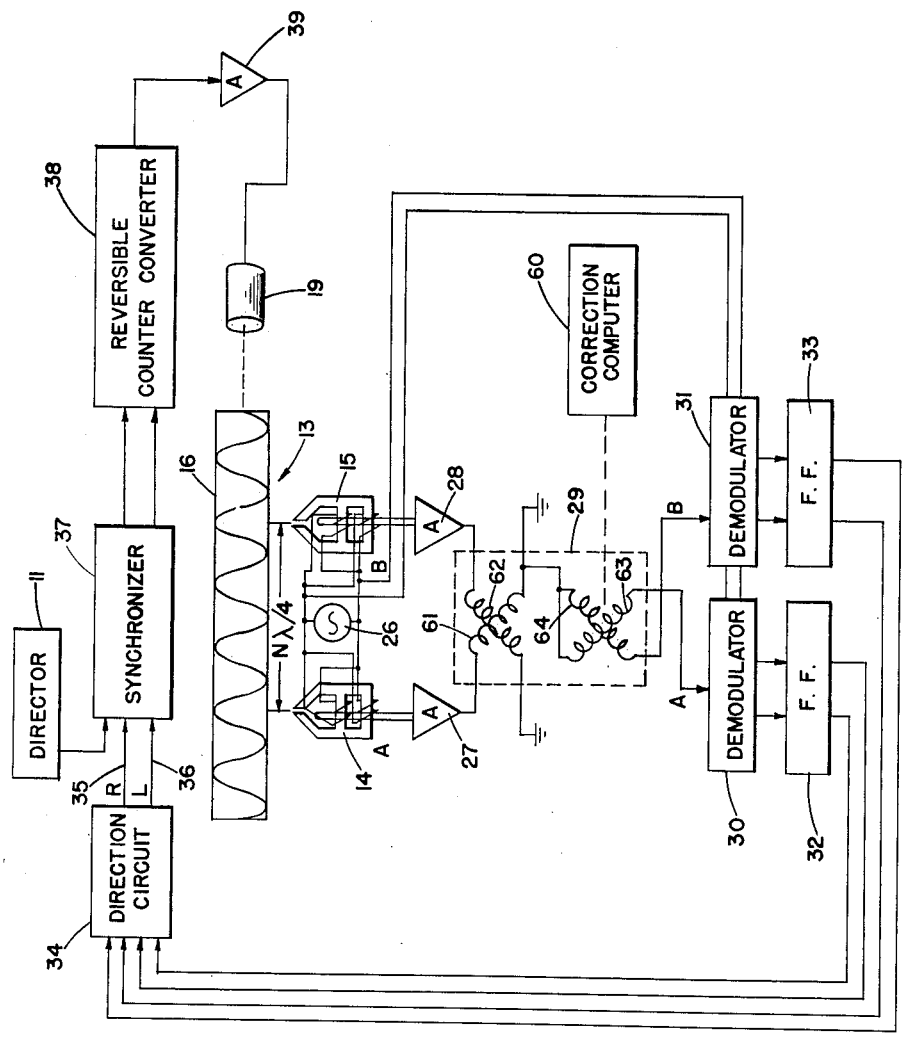
FIG. 2 illustrates partly in block form an exemplary digital servo system embodying the X axis correction apparatus of this invention.

As illustrated in FIG. 2, the gage 13 may comprise a pair of magnetic pickup heads 14 and 15 designed to read a periodically varying signal recorded on gage rod 16. The signal may be a magnetic recording and the heads may be those termed "saturable reactor" type heads which provide indications without the requirement of relative movement between heads and the magnetic track recorded on member 16. The periodically varying signal may be generally sinusoidal in form. The signal produced by these heads may be unvarying as, for example, when the heads are stationary or varying when the heads are moving. As the heads move the signal varies periodically reproducing the recorded sine wave and oscillator 26 provides excitation to the heads 14 and 15 which in turn provide outputs to amplifiers 27 and 28. Neglecting for the present description the error correction resolver 29, the outputs of amplifiers 27 and 28 are fed to phase sensitive demodulators 30 and 31 which are phase-referenced from oscillator 26. Heads 13 and 14 are spaced an odd number of quarter wave lengths apart along the gage member 16. The output of each demodulator during continuous motion of the table and gage member 16 will comprise a sine wave illustrated in FIG. 3 as curve A (demodulator 30) and curve B (demodulator 31).

The demodulator outputs are applied to flip-flops or bistable multivibrators 32 and 33, respectively, which are set into one or the other states thereof in accordance with the polarity of the input signal thereto. Thus, the output of flip-flop 32 will comprise the square wave indicated at C in FIG. 3 while the output of flip-flop 33 will comprise the square wave designated as D. Flip-flop 32 may be said to be an analog-digital converter in one concept, changing a smoothly changing variable to a signal of discrete values such as a readily distinguishable square wave. In another sense each flip-flop indicates or counts the periodical variations of the sinusoidal wave where each flip-flop may be considered as a single stage counter which counts one complete period of the received sinusoidal wave by returning to its original state. The same may be said of flip-flop 33. The flip-flops indicate half wave lengths by changing their respective states. A direction circuit 34 is connected to receive the outputs of the flip-flops and provides a pulse on line 35 for each quarter wave length of relative motion of heads 14 and 15 with respect to member 16 in one direction and a pulse on line 36 for each quarter wave length of such motion in the other direction. Lines 35 and 36, together with the pulse output of director 11, provide the inputs to synchronizing circuitry 37 which stores the pulses for a period of time to prevent synchronous transmisison thereof to digital comparator 38. The comparator counts the difference between the number of director and gage pulses and provides an analog error signal as the output thereof which is a function of or proportional to this difference. The error signal is fed through amplifier 39 to motor 19 which drives the table and gage member 16.

The described digital servo system is substantially similar to the digital servo of FIG. 2 of the patent to Seid et al., No. 2,537,427. The gage or tachometer constituted by elements 6–11 of the patent is analogous in function to the magnetic gage, demodulators, flip-flops and direction circuit 34 of the present invention. Synchronizing circuitry 37 may be similar to synchronizers 12, 13 and 15 of the patent. Comparator 38 may be similar in structure and function to the reversible binary counter of the patent and the output circuitry associated therewith. Amplifier 39 and motor 19 are, of course, analogous to amplifier 22 and motor 5 of the patent and may be structurally similar thereto. It is to be understood that while a magnetic gage is illustrated for generating a two-phase signal, there may be utilized in its place any other gage having a similar two-phase output such as, for example, an optical gage or a conventional two-phase resolver having its rotor driven in proportion to table motion.

Figure 3:
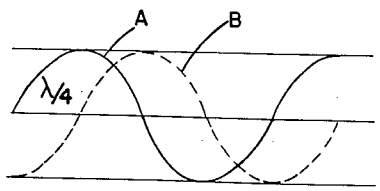
FIG. 3 illustrates certain wave forms of the apparatus of FIG. 2.
Figure 3:
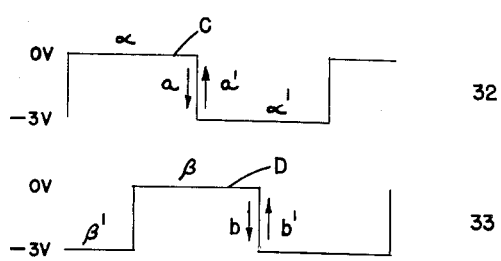

As previously stated, the two-phase signal from the gage heads 14 and 15 are to be converted to a pair of pulse trains each indicative of motion in one of two directions along one axis of the machine. From inspection of curves C and D of FIG. 3, representing the outputs of flip-flops 32 and 33, the following equations expressed in the notation of Boolean algebra may be derived for each quarter wave increment of motion to the right, R, and for each quarter wave increment of motion to the left, L:

$$R = \alpha b' + \beta a + \alpha' b + \beta' a' \quad (1)$$

$$L = \alpha b + \alpha' \beta + \alpha' b' + \beta' a \quad (2)$$

where $\alpha$ indicates the one state such as zero volts, for example, of flip-flop 32; $\alpha'$ indicates the zero state such as −3 volts, for example, of the flip-flop; $\beta$ represents the 0 volt state of flip-flop 33; $\beta'$ represents the −3 volt state of the flip-flop; $a$ represents a change from $\alpha$ to $\alpha'$; $a'$ represents a change from $\alpha'$ to $\alpha$; $b$ represents the change from $\beta$ to $\beta'$; and $b'$ represents a change from $\beta'$ to $\beta$. Equation 1 states, for example, that a pulse R indicative of motion to the right will occur when both $\alpha$ and $b'$ exist or when both $\beta$ and $a$ exist or when both $\alpha'$ and $b$ exist or when both $\beta'$ and $a'$ exist. Similarly, Equation 2 may be interpreted as stating that the pulse L will occur if $\alpha$ and $b$ exist or if $a'$ and $\beta$ exist or if $\alpha'$ and $b'$ exist or if $\beta'$ and $a$ exist. Mechanization of Equations 1 and 2 will provide an indication such as a pulse, for example, every quarter wave length of wave A of FIG. 3.

Figure 4:
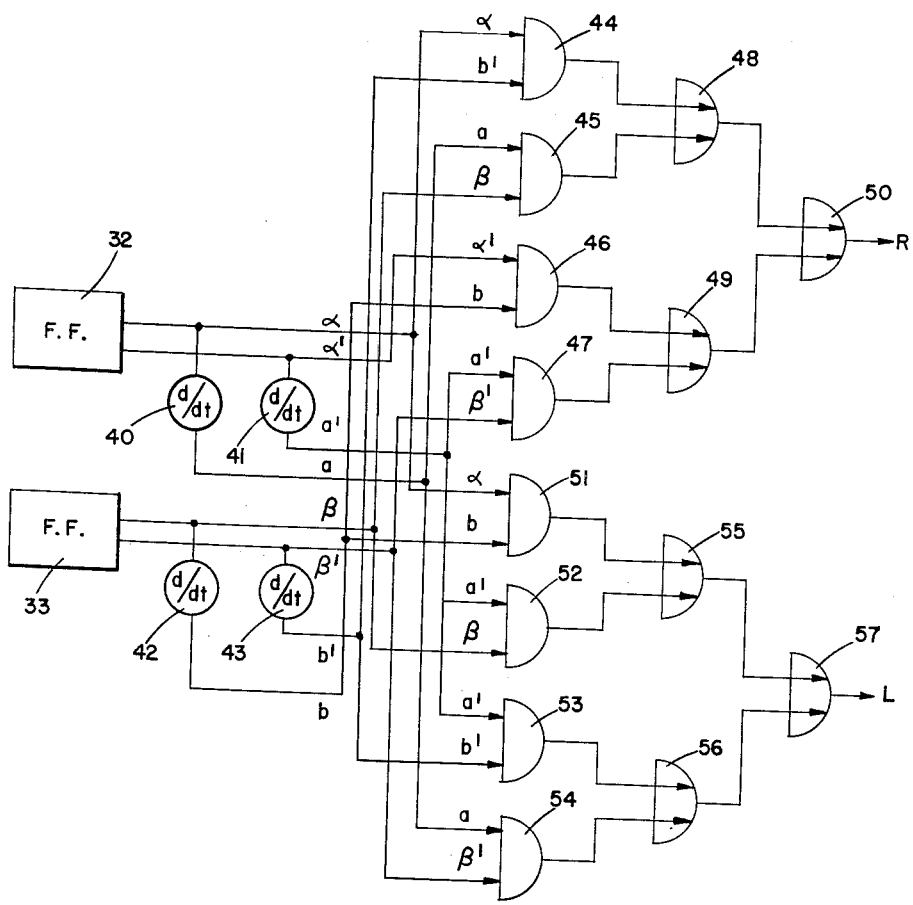
FIG. 4 is a block diagram of the direction circuit of FIG. 2.

Illustrated in FIG. 4 is the logical circuitry for mechanizing Equations 1 and 2. The propositions $\alpha$ and $\alpha'$ are represented by the alternative states of flip-flop 32 while the propositions $\beta$ and $\beta'$ are represented by the alternative states of flip-flop 33. The propositions $a$, $a'$, $b$ and $b'$ represent changes of state of the flip-flops and may be derived as indicated by differentiating circuits 40, 41, 42 and 43. Coincidence of the flip-flop voltage level or state indicative of $\alpha$ with the flip-flop change of state indicative of $b'$ is determined in coincidence or AND gate 44. Similarly, $a$ and $\beta$, $\alpha'$ and $b$ and $a'$ and $\beta'$ are fed to AND gates 45, 46 and 47, respectively. The outputs of AND gates 44 and 45 are fed to OR gate 48 while the outputs of AND gates 46 and 47 are fed to OR gate 49 with both OR gates feeding a third OR gate 50 which provides as its output the proposition R as defined by Equation 1. Similarly, the signal combinations $\alpha b$, $a'\beta$, $a'b'$, and $a\beta$ are fed to AND gates 51, 52, 53 and 54, the outputs of gates 51 and 52 being fed to OR gate 55 while the output of gates 53 and 54 are fed to OR gate 56. The outputs of OR gates 55 and 56 are fed to OR gate 57 which thus provides as its output a pulse indicative of the proposition L as defined by Equation 2. Thus, a pulse will appear on line 35 of FIG. 2 for each quarter wave increment of motion in one direction and a pulse will appear on line 36 for each quarter wave increment of motion in the other direction.

The correction circuitry of this invention computes a desired correction signal in correction computer 60 of FIG. 2 and effects modification of the two-phase gage signal without changing the form of this signal. The resolver 29 is interposed between the gage and the direction circuitry or, more particularly, between amplifiers 27 and 28 and demodulators 30 and 31 and in effect feeds to the demodulators or the direction circuitry a two-phase signal indicative of the algebraic sum of the gage sensed physical movement of the head and the offset or correction signal derived from computer 60. The resolver 29 includes a set of stator windings 61 and 62 fed from amplifiers 27 and 28 respectively and a set of rotor windings 63 and 64 inductively coupled to the set of stator windings and supplying the inputs of demodulators 30 and 31 respectively. The output of correction computer 60 is a shaft rotation which effects rotation of the rotor windings relative to the stator windings and operates in the same way as a conventional differential selsyn to provide as its output the algebraic sum of the two-phase signal in the stator windings and the shaft rotation input to the rotor.

Figure 5:
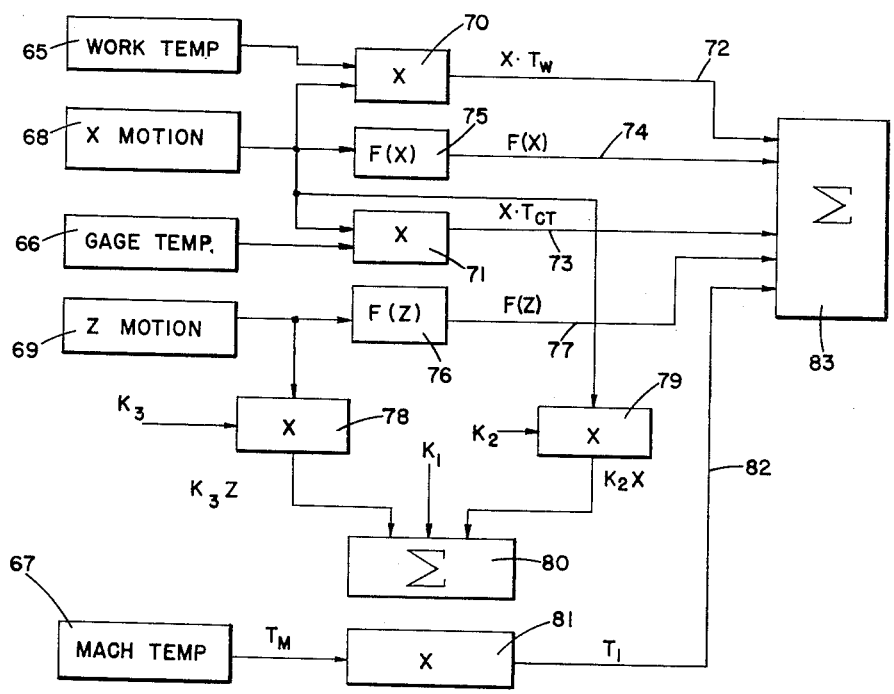
FIG. 5 is a block diagram of the correction computer.

As illustrated in FIG. 5, the correction computer includes a workpiece temperature sensing device 65, a gage temperature sensing device 66, a machine temperature sensing device 67, and motion sensing devices 68 and 69 for sensing table motion in the direction of the X and Z axes respectively. An electrical signal proportional to workpiece temperatures is multiplied by a signal proportional to X axis motion in multiplier 70 while a signal proportional to gage temperature is multiplied by the X axis motion signal in the multiplier 71. The outputs of the multipliers on lines 72 and 73 respectively are thus proportional to total temperature induced change in workpiece dimension over the distance moved and temperature induced total change of gage rod dimension over the distance moved. Since the gage itself may have inaccuracies particularly in the recording of the indicia or the magnetic track on element 16 or inaccuracies in the gratings of an optical gage, a signal indicative of variation of these inaccuracies with X axis motion is derived on line 74 from a nonlinear device 75 calibrated in accordance with the determined gage rod imperfections. Since lack of perpendicularity of axes introduces an error in table motion proportional to cross-feed movement, a signal indicative of Z axis motion is fed through a suitably calibrated device such as potentiometer 76 to yield a signal on line 77 indicative of the error due to lack of perpendicularity. The error resulting from temperature changes of the machine itself is computed from the following expression:

$$e_m = K_1 T_m + K_2 T_m X + K_3 T_m Z \quad (3)$$
$$= T_m(K_1 + K_2 X + K_3 Z) \quad (4)$$

when $e_m$ equals machine temperature error along the X axis; $T_m$ equals machine temperature; X equals X axis displacement of the table; Z equals Z axis or cross-feed displacement of the table; $K_1$, $K_2$ and $K_3$ are constants. Equation 4 is machanized by multiplying in multiplier 78 signals indicative of the constant $K_3$ and the Z axis motion. The signal indicative of the constant $K_2$ is multiplied by the signal indicative of X axis motion in multiplier 79. The outputs of multiplier 78 and 79 are summed together with a signal indicative of the constant $K_1$ in summing network 80 to provide one of the inputs to multiplier 81 having a signal indicative of machine temperature $T_m$ as the other input thereto. The output of multiplier 81 on line 82 is fed together with the other computed corrections on lines 72, 73, 74 and 77 into summing network 83 which drives a servo motor to provide output shaft rotation proportional to the sum of the computed corrections. It is to be understood that the signals representing work, gage and machine temperatures actually represent the deviations of the actual temperatures of work, gage and machine from predetermined reference temperatures at which the temperature errors are zero. The circuitry is therefore arranged to deliver zero output correction at the reference or standard temperature, and either positive or negative output corrections depending upon the sense of deviation from reference temperature.

As indicated in FIG. 6, an exemplary mechanization of the correction computer of FIG. 5 may comprise an oscillator 84 supplying an alternating current of suitable frequency to potentiometer 85 which has the wiper arm thereof driven in accordance with X axis motion by any suitable means such as gear 86 and a table attached rack 87. The voltage on the wiper arm potentiometer 85 is fed to a resistance bridge network 88 having in one arm thereof a temperature variable resistance or thermistor 89 suitably positioned on the workpiece to provide the signal indicating temperature of the workpiece. The output of bridge 88, the product of rotation of gear 86 and the temperature deviation indicated by thermistor 89 is fed through transformer 90 to resistor 91 of summing network 83. Similarly, X axis motion indicated by the voltage of the wiper of potentiometer 85 is multiplied in resistance bridge 92 by a signal indicative of gage temperature deviation derived from a temperature varying resistor 93 electrically forming one arm of the bridge and physically positioned to sense gage temperature. The output of bridge 92 is fed through transformer 94 to resistor 95 of summing network 83. X axis motion in the form of rotation of gear 86 is also fed to drive the wiper arm of nonlinear potentiometer 96 which is energized from oscillator 84. The nonlinearity of potentiometer 96 is determined in accordance with those errors of the gage or other elements of the system which have been previously measured and are a function of table displacement only. These errors may be, for example, inaccuracies in the linearity of the motion information recorded on the gage rod. The output from the wiper of potentiometer 96 is fed to summing network 83 through resistor 97 thereof. For the correction component indicative of the lack of perpendicularity of the axes, potentiometer 98 energized from source 84 has its wiper arm driven in accordance with Z axis motion by means of gear 99 and a table attached rack 100 whereby the wiper arm feeds a signal to resistor 101 of summing network 83 representing the error due to predetermined lack of perpendicularity of the axes as a function of cross-feed motion.

The error resulting from machine temperature changes may be derived from the output of resistance bridge 102 which has a temperature varying resistor 103 electrically connected as one bridge arm and physically positioned to sense machine temperature. Resistance bridge 102 is energized by the summing network including resistors 104, 105 and 106 which introduce the constants $K_2$, $K_1$ and $K_3$ respectively and are respectively fed with signals indicating X axis motion (from the wiper of potentiometer 85), the constant voltage source 84 and a signal indicating cross-feed motion from the wiper of potentiometer 98. Thus the sum $(K_1 + K_2 X + K_3 Z)$ is multiplied by machine temperature to provide as the output of the bridge 102 the machine temperature deviation correction signal which is fed through transformer 107 to resistor 110 of summing network 83. The output of summing network 83 is fed to the input of servo motor 108 which drives the wiper arm of potentiometer 109 energized from source 84. The voltage on the wiper arm of potentiometer 109 is fed back to the amplifier input of the conventional servo motor 108 whereby the shaft rotation output of the servo motor drives the linear potentiometer 109 until the voltage at the amplifier input of the servo motor is zero. Thus, the shaft rotation output of servo motor 108 will be equal to the sum of the several corrections computed as described above. As indicated in FIG. 2, the shaft rotation output of servo motor 108 is applied to drive the rotor of resolver 29 to effect the proper correction of the signals read by the gage.

While the described correction computer computes and sums a number of correction signal components, it will be readily appreciated that any one or more of such computed components may be utilized as deemed necessary or desirable. Additionally, any other corrections or additions to the gage signal which may be desired to be combined with the gage signals can be introduced simply as additional inputs to the summing network 83.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A servo system comprising an electrical to mechanical converter for producing an output mechanical movement in response to an electrical input thereto, gage means for generating a multi-phase electrical signal indicative of said movement, a signal source having an output, means for combining said output with said multi-phase signal to produce a modified gage signal, a source of input signal, and means responsive to said input signal and said modified gage signal for providing said electrical input to said converter.

2. A servo system comprising an electrical to mechanical converter for producing an output mechanical movement in response to an electrical input thereto, gage means for generating a response signal indicative of said movement, sensing means for generating a signal indicative of a selected condition of said system, means responsive to said sensing means for computing a correction signal as a function of said sensed condition, means for combining said correction signal with said response signal to produce a corrected gage signal, a source of input signal, and means responsive to said input signal and said corrected gage signal for providing said electrical input to said converter.

3. A servo system comprising means for generating an error signal, an electrical to mechanical converter for producing an output mechanical movement in response to said error signal, said error signal generating means comprising gage means for producing a multi-phase electrical signal indicative of said movement, a variable signal source having an output, means for combining said output with said multi-phase signal, and means responsive to said combining means for deriving said error signal.

4. A servo system comprising means for generating an error signal, an electrical to mechanical converter for producing an output mechanical movement in response to said error signal, said error signal generating means comprising gage means for producing a response electrical signal indicative of said movement, means for sensing a selected condition of said system, means responsive to said sensing means for producing a correction signal indicative of system error due to variation of said condition, means for combining said correction signal with said response signal, and means responsive to said combining means for deriving said error signal.

5. A digital servo system comprising electrically controlled driven means for producing an output mechanical movement, gage means responsive to said driven means for generating a multi-phase signal indicative of said movement, a signal source having an output, means for combining said output with said multi-phase signal to produce a modified multi-phase gage signal, means for converting said modified gage signal to a series of pulses indicative of said movement and said output, a source of director pulses, and comparator means for controlling said driven means in accordance with the difference in the number of said series of pulses and said director pulses.

6. An automatic machine for operating on a workpiece movable relative thereto in at least one direction comprising a gage for generating gage signals indicative of said relative motion, and correction computing means for compensating said gage signals, said computing means comprising means for generating a condition signal indicative of at least one predetermined condition of said machine, means for generating a correction signal as a function of said condition signal and means for combining said correction signal with said gage signal.

7. An automatic machine for operating on a workpiece movable relative thereto including a gage for generating signals indicative of said relative motion; a correction computer for compensating said gage signals; said computer comprising temperature and motion sensing devices, means responsive to said devices for computing a correction signal as a predetermined function of sensed temperature and motion, and means for combining said correction signal with said gage signals.

8. An automatic machine for operating on a workpiece movable relative thereto in each of two mutually angulated directions, said machine including a pair of gages for generating signals individually indicative of said relative motion in each of said directions respectively, and a correction computer for compensating at least one of said gage signals, said computer comprising means for generating a first signal indicative of the product of workpiece temperature and said relative motion in one of said directions, means for generating a second signal indicative of the product of the temperature of one of said gages and motion in said one direction, means for generating a third signal indicative of said motion in said one direction, means for generating a fourth signal indicative of said relative motion in the other of said directions, means for generating a fifth signal indicative of the product of temperature of said machine and a predetermined function of said relative motion, means for combining said computer signals to provide a correction signal and means for combining said correction signal with said one gage signal.

9. In a digital servo system having a gage for generating a multi-phase signal indicative of output motion and means for producing an error signal from said signal, the improvement comprising a multi-phase resolver coupled between said gage and error signal producing means, a condition sensing device coupled with said system, a correction computer having an input from said device for generating a correction signal, and means for operating said resolver in response to said correction signal.

10. In a digital servo system having a gage for generating a multi-phase signal indicative of output motion, a direction circuit for converting said signal to a digital signal, and a digital comparator for producing an error signal as a function of the difference between said digital signal and an input digital signal, the improvement comprising a multi-phase resolver having a set of rotor windings and a set of stator windings, the number of windings of each set being at least equal to the number of phases of said gage signal, means for applying the phases of said gage signal individually to respective windings of one of said sets, a signal source, means for rotating said rotor set in accordance with said source, and means for coupling the windings of the other of said sets to said direction circuit.

11. In a digital servo system having a gage for generating a multi-phase signal indicative of output motion, the improvement comprising a multi-phase resolver having a first set of coils coupled to said gage and a second set of coils connected to provide an output, a signal source, and means for relatively rotating said sets in response to said signal source.

12. An automatic machine for operating on a workpiece movable relative thereto including a gage for generating signal indicative of said relative motion; a correction computer for compensating said gage signals; said computer comprising a temperature sensing device, means responsive to said device for computing a correction signal as a predetermined function of sensed temperature, and means for combining said correction signal with said gage signals.

References Cited in the file of this patent

UNITED STATES PATENTS

| | | |
|---|---|---|
| 2,537,770 | Livingston et al. | Jan. 9, 1951 |
| 2,867,759 | Comstock | Jan. 6, 1959 |